(12) United States Patent
Hsu

(10) Patent No.: US 9,888,200 B2
(45) Date of Patent: Feb. 6, 2018

(54) IMAGE SENSOR AND OPERATING METHOD THEREOF

(71) Applicant: PIXART IMAGING INC., Hsin-Chu County (TW)

(72) Inventor: En-Feng Hsu, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

(21) Appl. No.: 15/155,207

(22) Filed: May 16, 2016

(65) Prior Publication Data
US 2017/0034465 A1    Feb. 2, 2017

(30) Foreign Application Priority Data
Jul. 31, 2015 (TW) .............................. 104125065 A

(51) Int. Cl.
| H04N 5/374 | (2011.01) |
| H04N 5/378 | (2011.01) |
| H04N 5/335 | (2011.01) |
| H04N 5/235 | (2006.01) |
| H04N 5/353 | (2011.01) |
| H04N 5/3745 | (2011.01) |

(52) U.S. Cl.
CPC .......... *H04N 5/378* (2013.01); *H04N 5/37452* (2013.01)

(58) Field of Classification Search
CPC .... H04N 5/37452; H04N 5/378; H04N 5/335; H04N 5/2353; H04N 5/353; H04N 5/374; H04N 5/3532; H04N 5/2329
USPC .......... 348/296, 307, 308, 367; 341/122–126
See application file for complete search history.

(56) References Cited

U.S. PATENT DOCUMENTS

| 9,661,250 B2* | 5/2017 | Hsu | H04N 5/144 348/250 |
| 9,686,489 B2* | 6/2017 | Hsu | H04N 5/357 |
| 2006/0256221 A1* | 11/2006 | McKee | H01L 27/14603 348/308 |
| 2010/0302426 A1* | 12/2010 | Moini | H04N 5/3559 348/308 |
| 2013/0044247 A1* | 2/2013 | Kawahito | H04N 5/35581 348/296 |
| 2016/0155768 A1* | 6/2016 | Yi | H01L 27/14643 250/208.1 |

* cited by examiner

*Primary Examiner* — Tuan Ho
*Assistant Examiner* — Marly Camargo
(74) *Attorney, Agent, or Firm* — Hauptman Ham, LLP

(57) ABSTRACT

There is provided an operating method of an image sensor including: storing a first charge from an optoelectronic circuit to a pixel buffer circuit within a first exposure period; storing a second charge from the optoelectronic circuit to the pixel buffer circuit within a second exposure period; transferring the first charge from the pixel buffer circuit to a first storage circuit outside of pixel circuits; transferring the second charge from the pixel buffer circuit to a second storage circuit outside of pixel circuits; and comparing the first charge with the second charge to output an analog image signal.

20 Claims, 12 Drawing Sheets

IMAGE SENSOR AND OPERATING METHOD THEREOF

RELATED APPLICATIONS

The present application is based on and claims priority to Taiwanese Application Number 104125065, filed Jul. 31, 2015, the disclosure of which is hereby incorporated by reference herein in its entirety.

BACKGROUND

1. Field of the Disclosure

This disclosure generally relates to an image sensor and, more particularly, to an image sensor utilizing the analog differencing and an operating method thereof.

2. Description of the Related Art

A conventional image sensor generally has a plurality of sensing pixels arranged in array, wherein one operating method of the image sensor, for example, uses a rolling shutter to successively activate, with a control signal, each row of the sensing pixels in the image sensor to capture an image. Since each row of the sensing pixels is successively activated instead of simultaneously activated (i.e. start timings for each row of the sensing pixels to be exposed are different), the image captured by using the rolling shutter may have distortion in capturing an image of a fast moving object.

Another operating method of the image sensor uses a global shutter, for example, to simultaneously activate all sensing pixels in the image sensor with a control signal so that each row of the sensing pixels starts to be exposed at an identical time to capture an image. Therefore, the image sensor using the global shutter may avoid the problem of distortion.

However, in order to eliminate ambient light interference or reduce the image noise when the image sensor uses the global shutter to capture an image, one conventional solution is to directly perform a subtraction between two digital image frames through image post processing so as to obtain a differential image frame. For example, referring to FIGS. 1A and 1B, FIG. 1A is a timing diagram of a conventional image sensor 91 using the global shutter to capture an image. It is assumed that the image sensor 91 has 4 rows of sensing pixels $R_1$-$R_4$. In a first period $P_1$, a light source is turned on for a predetermined time and the rows of sensing pixels $R_1$-$R_4$ are simultaneously exposed. Then, the light source is turned off and the rows of sensing pixels $R_1$-$R_4$ are successively read to output a first image signal. In a second period $P_2$, the light source is turned off and the rows of sensing pixels $R_1$-$R_4$ are simultaneously exposed for the predetermined time, and the rows of sensing pixels $R_1$-$R_4$ are successively read to output a second image signal.

Then, referring to FIG. 1B, the first image signal outputted from the image sensor 91 is firstly converted into a first digital signal 9a through an analog to digital converter 93 to be stored in a digital buffer 95. Then, the second image signal is converted into a second digital signal 9b through the analog to digital converter 93. Finally, the second digital signal 9b is subtracted from the first digital signal 9a to obtain a third digital signal 9c in which ambient light is removed. However, in this way, the digital buffer 95 has to be disposed in a system including the image sensor 91 and the image sensor 91 must successively output two image frames (e.g., image frames formed according to the first digital signal 9a and the second digital signal 9b) so that one processed image frame is obtainable (e.g., an image frame formed according to the third digital signal 9c).

SUMMARY

Accordingly, the present disclosure provides an image sensor utilizing the analog differencing and an operating method thereof, wherein the analog differencing is performed in an output circuit outside a pixel circuit.

The present disclosure further provides an image sensor and an operating method thereof that do not employ a digital buffer to store a whole digital image for the differential operation of two digital image frames.

The present disclosure further provides an image sensor and an operating method thereof capable of effectively improving the signal-to-noise ratio of image signals.

The present disclosure provides an image sensor. The image sensor includes a plurality of pixel circuits arranged in a matrix and a plurality of output circuits, wherein each of the output circuits is coupled to one pixel circuit column via a readout line. Each of the pixel circuits includes an optoelectronic conversion circuit, a floating diffusion region, and a storage node. The optoelectronic conversion circuit is configured to generate a photocurrent. The floating diffusion region is configured to receive the photocurrent within a first exposure time to store a first charge and store the first charge for a storage interval. The storage node is configured to receive the photocurrent within a second exposure time to store a second charge, wherein the storage interval is between the first exposure time and the second exposure time. Each of the output circuits includes a first storage circuit, a second storage circuit and a differential unit. The first storage circuit is configured to store a first output voltage formed by reading the first charge in the floating diffusion region within a readout interval. The second storage circuit is configured to store a second output voltage formed by reading the second charge in the storage node within the readout interval. The differential unit is configured to compare the first output voltage with the second output voltage to output an analog image signal.

The present disclosure further provides an image sensor. The image sensor includes a plurality of pixel circuits arranged in a matrix and a plurality of output circuits, wherein each of the output circuits is coupled to one pixel circuit column via a readout line. Each of the pixel circuits includes an optoelectronic conversion circuit, a floating diffusion region and a storage node. The optoelectronic conversion circuit is configured to generate a photocurrent. The floating diffusion region is configured to sequentially store a first reset charge and a first accumulation charge of accumulating a first charge and the first reset charge within a second exposure time, and sequentially store a second reset charge and a second accumulation charge of accumulating a second charge and the second reset charge within a readout interval. The storage node is configured to receive the photocurrent within a first exposure time to store the first charge for a storage interval, sequentially transfer the first charge to the floating diffusion region to generate the first accumulation charge and receive the photocurrent to store the second charge within the second exposure time, and transfer the second charge to the floating diffusion region to generate the second accumulation charge within the readout interval, wherein the storage interval is between the first exposure time and the second exposure time. Each of the output circuits includes a first storage circuit, a second storage circuit, a third storage circuit, a fourth storage circuit, a first differential unit, a second differential unit and a third differential unit. The first storage circuit is configured to store a first reset voltage formed by reading the first reset charge in the floating diffusion region within the second exposure time. The second storage circuit is configured to store a first output voltage formed by reading the first accumulation charge in the floating diffusion region within the second exposure time. The third storage circuit is configured to store a second reset voltage formed by reading the second reset charge in the floating diffusion region within the readout interval. The fourth storage circuit is configured to store a second output voltage formed by reading the second accumulation charge in the floating diffusion region within the readout interval. The first differential unit is configured to compare the first reset voltage with the first output voltage to output a first differential signal. The second differential unit is configured to compare the second reset voltage with the second output voltage to output a second differential signal. The third differential unit is configured to compare the first differential signal with the second differential signal to output an analog image signal.

The present disclosure further provides an operating method of an image sensor. The image sensor includes a plurality of pixel circuits arranged in a matrix and a plurality of output circuits. Each of the pixel circuits includes an optoelectronic conversion circuit and a pixel buffer circuit. Each of the output circuits is coupled to one pixel circuit column and includes a first storage circuit and a second storage circuit. The operating method includes the steps of: storing a first charge from the optoelectronic conversion circuit to the pixel buffer circuit within a first exposure time; storing a second charge from the optoelectronic conversion circuit to the pixel buffer circuit within a second exposure time; reading the first charge in the pixel buffer circuit to store a first output voltage in the first storage circuit; reading the second charge in the pixel buffer circuit to store a second output voltage in the second storage circuit; and comparing the first output voltage with the second output voltage to output an analog image signal.

The present disclosure further provides an operating method of an image sensor. The image sensor includes a plurality of pixel circuits arranged in a matrix and a plurality of output circuits. Each of the pixel circuits includes an optoelectronic conversion circuit and a pixel buffer circuit. Each of the output circuits is coupled to one pixel circuit column and comprising a first storage circuit, a second storage circuit, a third storage circuit and a fourth storage circuit. The operating method includes the steps of: storing a first charge from the optoelectronic conversion circuit to the pixel buffer circuit within a first exposure time; reading a first reset charge in the pixel buffer circuit to store a first reset voltage in the first storage circuit; reading a first accumulation charge of the first charge and the first reset charge accumulated in the pixel buffer circuit to store a first output voltage in the second storage circuit; storing a second charge from the optoelectronic conversion circuit to the pixel buffer circuit within a second exposure time; reading a second reset charge in the pixel buffer circuit to store a second reset voltage in the third storage circuit; reading a second accumulation charge of the second charge and the second reset charge accumulated in the pixel buffer circuit to store a second output voltage in the fourth storage circuit; comparing the first output voltage with the first reset voltage to generate a first differential signal; comparing the second output voltage with the second reset voltage to generate a second differential signal; and comparing the first differential signal with the second differential signal to generate an analog image signal.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
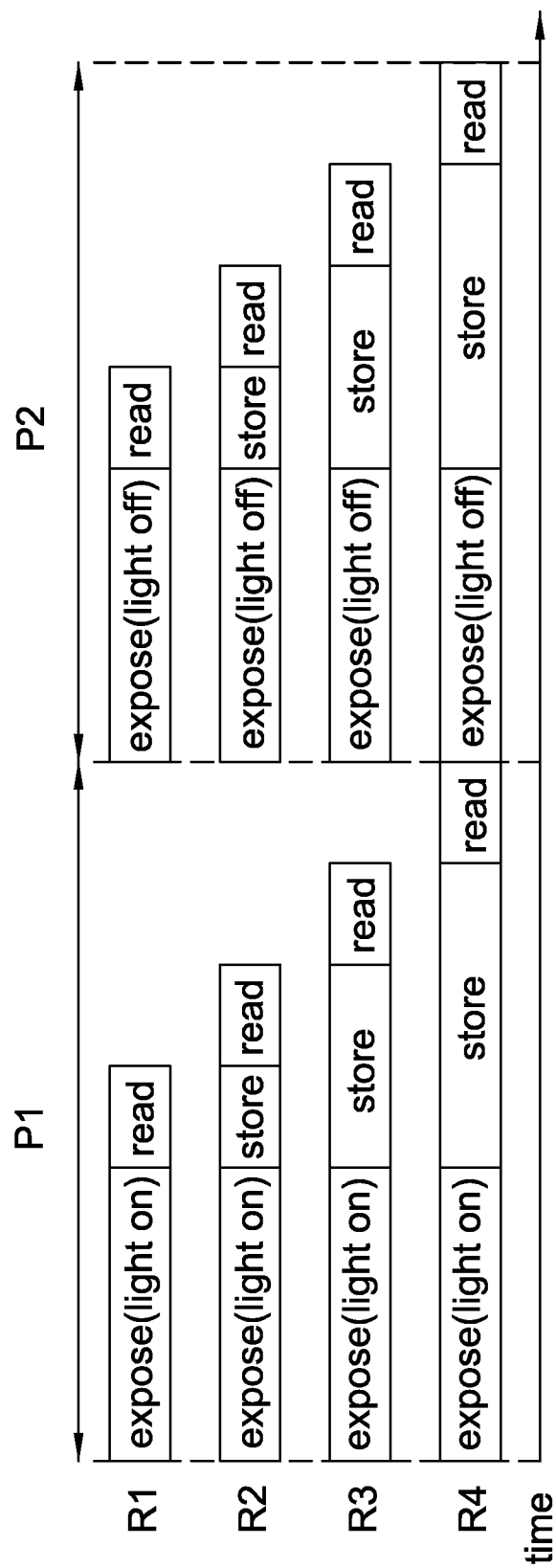
FIG. 1A is a timing diagram of a conventional image sensor using a global shutter to capture an image.
Figure 1B:
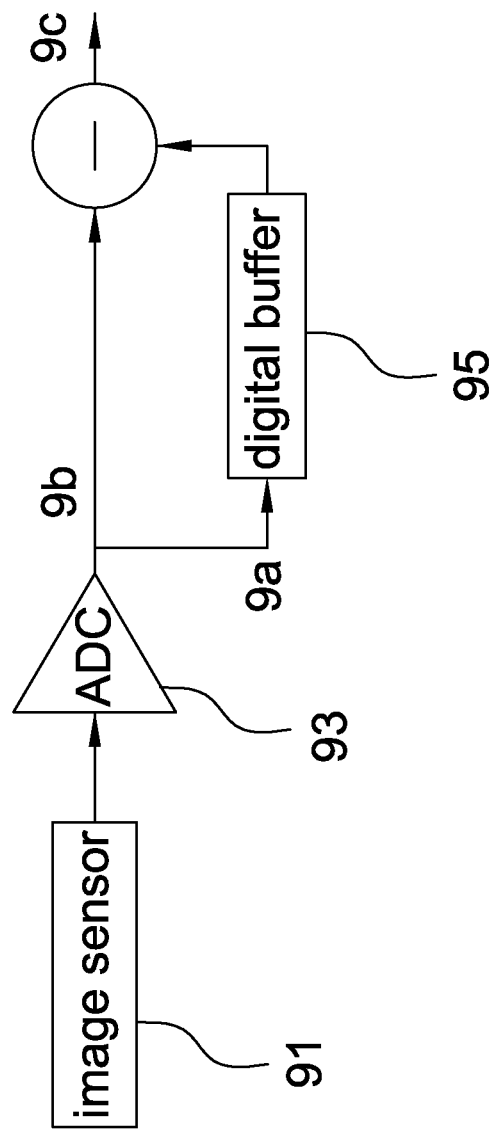
FIG. 1B is a block diagram of performing a conventional differential operation between two digital image frames.
Figure 2:
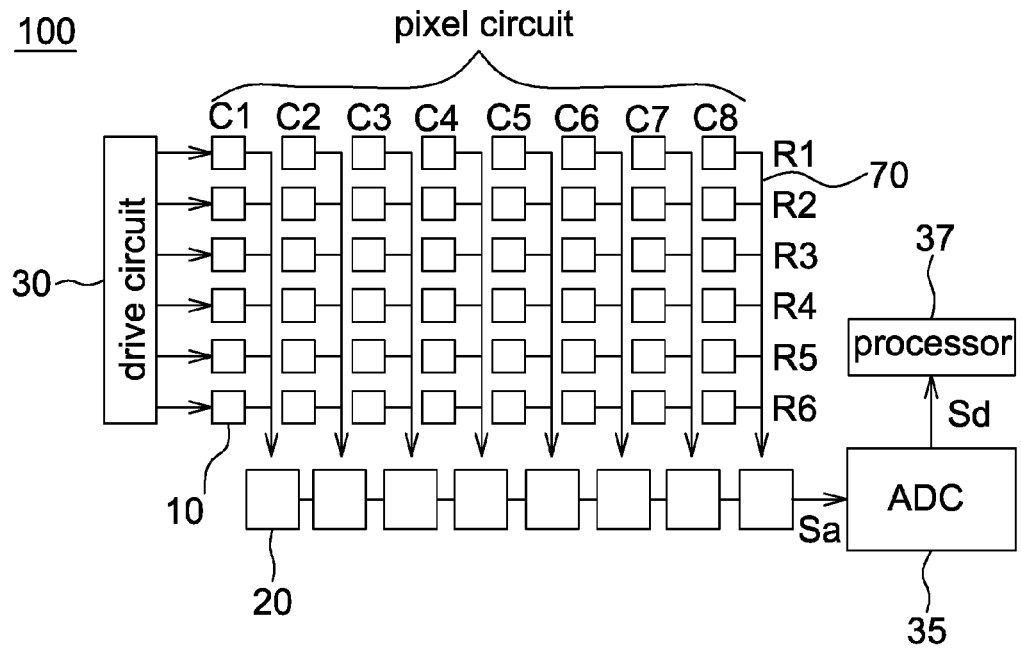
FIG. 2 is a block diagram of an image system according to some embodiments of the present disclosure.

Referring to FIG. 2, it is a block diagram of an image system 100 according to some embodiments of the present disclosure. The image system 100 includes a plurality of pixel circuits 10, a plurality of output circuits 20, a drive circuit 30, an analog to digital converter (ADC) 35 and a processor 37. The image system 100 is applied to, for example, a motion sensor, and is able to perform a differential operation in an analog front end to generate an analog image signal Sa. After the analog image signal Sa is converted into a digital image signal Sd by the ADC 35, the processor 37 performs the post-processing according to the digital image signal Sd, e.g., identifying the object motion and motion position, but not limited thereto. The processor 37 is, for example, a digital signal processor (DSP), a microcontroller (MCU) or a central processing unit (CPU), but not limited thereto.

The pixel circuits 10 are arranged in a matrix, e.g., having a plurality of pixel circuit rows R1-R6 and a plurality of pixel circuit columns C1-C8. Each of the output circuits 20 is coupled to every pixel circuit 10 of one pixel circuit column C1-C8 via a readout line 70 so as to read voltage signals and perform the differential operation. In other embodiments, each of the output circuits 20 is coupled to every pixel circuit 10 of one pixel circuit row R1-R6. The pixel circuits 10 and the output circuits 20 form an image sensor 1 (as shown in FIG. 2) of the present disclosure. In some embodiments, the image sensor 1 includes the ADC 35, and thus the image sensor 1 outputs the digital image signal Sd.

The drive circuit 30 is, for example, a signal generator or a timing controller, and configured to generate a plurality of control signals Sc to control ON/OFF of a plurality of switching elements in the pixel circuits 10 and the output circuits 20 (illustrated below with examples). The drive circuit 30 is disposed inside or outside of the image sensor without particular limitations.

Figure 3:
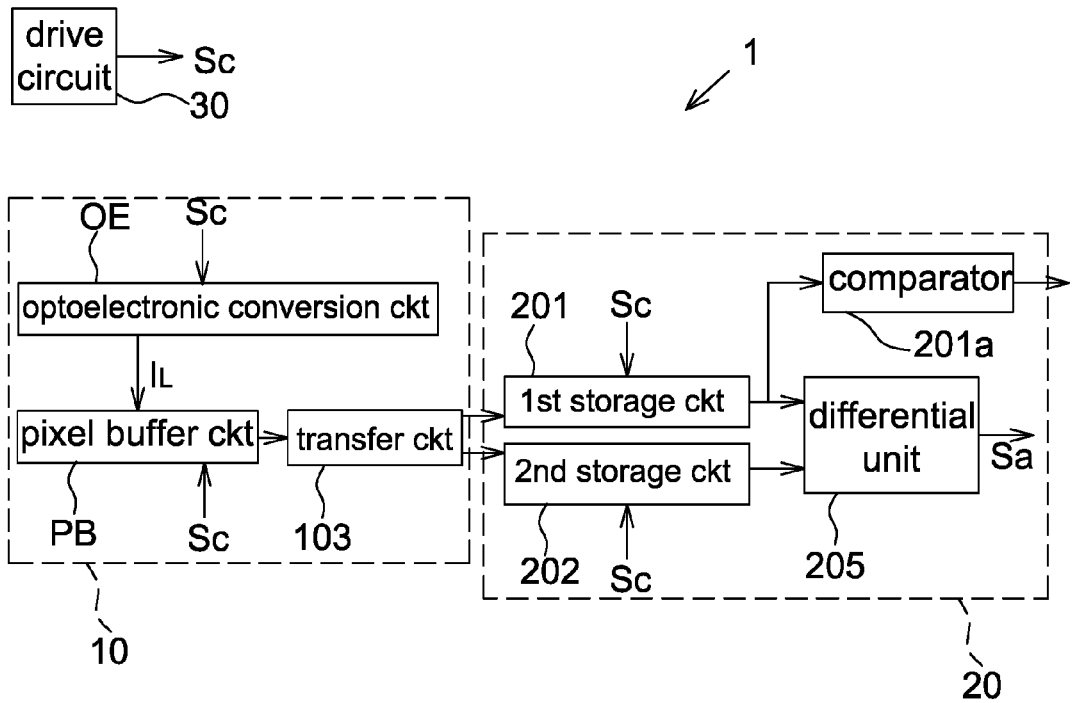
FIG. 3 is a block diagram of an image sensor according to a first embodiment of the present disclosure.

Referring to FIG. 3, it is a block diagram of an image sensor 1 according to a first embodiment of the present disclosure. The image sensor 1 is applied to, for example, the image system 100 of FIG. 2. As mentioned above, the image sensor 1 includes a plurality of pixel circuits 10 arranged in a matrix and a plurality of output circuits 20. Each of the pixel circuits 10 includes an optoelectronic conversion circuit OE, a pixel buffer circuit PB and a transfer circuit 103. Each of the output circuits 20 is coupled to every pixel circuit 10 of one pixel circuit column (e.g., C1-C8) and includes a first storage circuit 201, a second storage circuit 202 and a differential unit 205, wherein the first storage circuit 201 and the second storage circuit 202 include, for example, at least one capacitor, and the differential circuit 205 is, for example, a differential amplifier. In some embodiments, each the output circuits 20 further includes a comparator 201a for implementing the control of auto exposure. As mentioned above, the pixel circuits 10 and the output circuits 20 operate according to the control signal Sc from the drive circuit 30.

The optoelectronic conversion circuit OE generates a photocurrent $I_L$ to the pixel buffer circuit PB, wherein the photocurrent $I_L$ is positively correlated with light intensity received by the optoelectronic conversion circuit OE. The pixel buffer circuit PB receives the photocurrent $I_L$ to store a charge amount therein. The transfer circuit 103 converts the charge amount stored in the pixel buffer circuit PB to a voltage signal to be outputted to the output circuit 20. The first storage circuit 201 and the second storage circuit 202 temporarily store output voltage signals before the differential operation for the differential unit 205 to perform the differential operation and output an analog image signal Sa.

The output terminal of the output circuits 20 (e.g., an output terminal of the differential unit 205) is coupled to an analog to digital converter 35 (as shown in FIG. 2) to convert the analog image signal Sa to a digital image signal Sd. In this embodiment, the processor 37 identifies, for example, the object motion according to a number of pixels with nonzero gray values in one digital image (e.g., formed by a plurality of digital image signals Sd corresponding to the pixel circuits 10), and identifies, for example, the motion position according to positions of the pixels with nonzero gray values. The processor 37 then identifies, for example, the gesture according to a variation of the motion positions in a plurality of digital images. According to this arrangement, the differential operation is performed in the analog front end and outside of the pixel circuits 10 without being performed in the digital back end such that a digital buffer for storing a whole digital image is no longer required.

Figure 4:
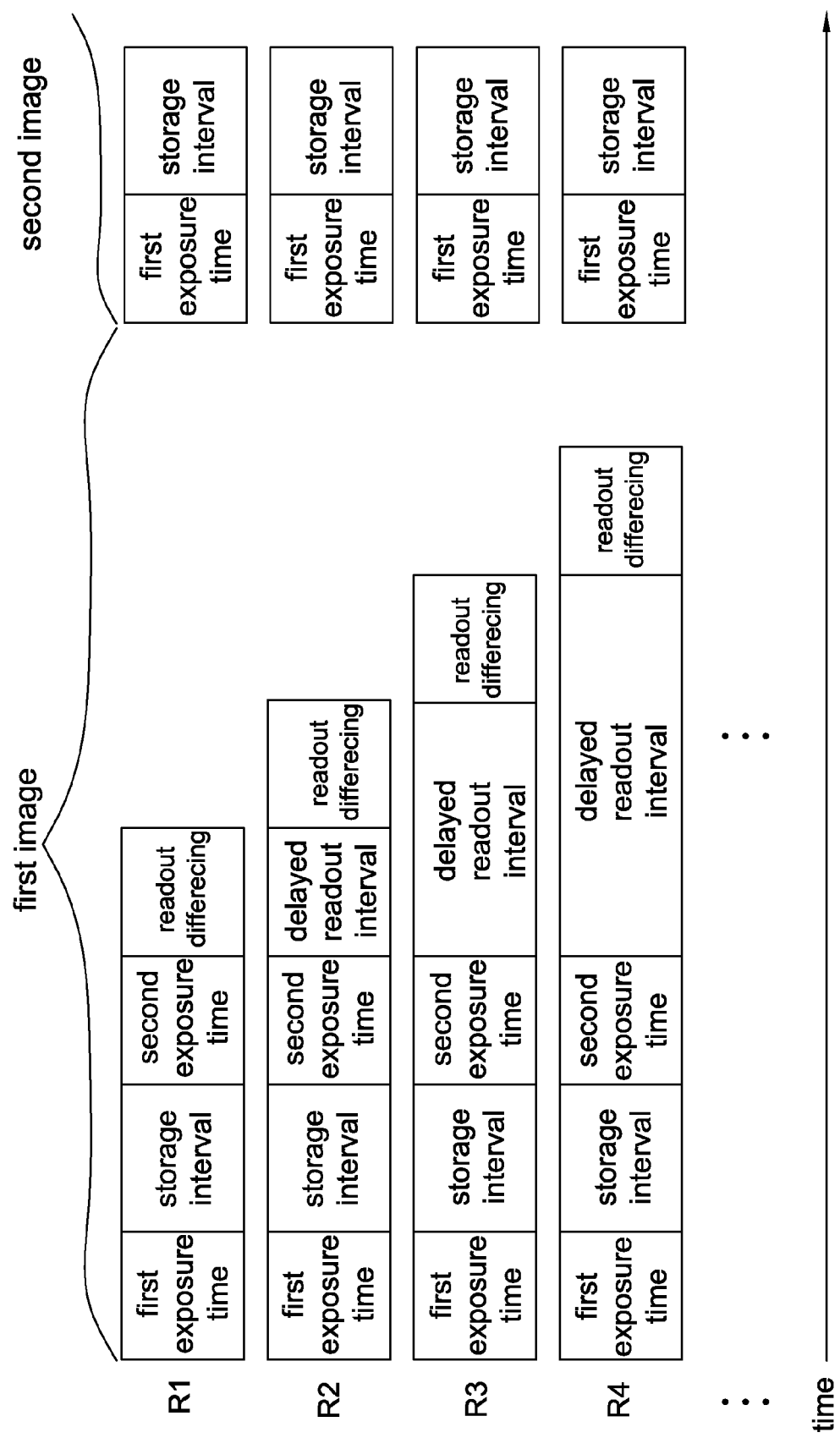
FIG. 4 is a timing diagram of an operation of an image sensor according to a first embodiment of the present disclosure.

Referring to FIG. 4, it is a timing diagram of an operation of an image sensor 1 according to a first embodiment of the present disclosure. The image sensor 1 of the first embodiment is a global shutter image sensor. In an interval of capturing one image (e.g., a first image), the operation of each of the pixel circuits 10 includes a first exposure time, a storage interval, a second exposure time and a readout interval. The first exposure time and the second exposure are used to store charges corresponding to two different time intervals. As this embodiment is operated without using a system light source, the stored charges are positively correlated with ambient light intensity. The storage interval is between the first exposure time and the second exposure time to determine a time difference between the first exposure time and the second exposure time. As the time difference is for an object to change the position or status thereof within the time difference, the storage interval is larger than 0 and identical in every pixel circuit row. A value of the storage interval is determined according to different applications without particular limitations. For example, when the image sensor 1 is used to detect a fast moving object or a close object, the storage interval is selected to be shorter; whereas, when the image sensor 1 is used to detect a slow moving object or a far object, the storage interval is selected to be longer. In the readout interval, the transfer circuit 103 reads a voltage signal associated with the stored charge from the pixel buffer circuit PB to the output circuit 20, and the differential operation of output voltages is then performed. As shown in FIG. 4, the first exposure times, the storage intervals and the second exposure times of every pixel circuit row (e.g., R1-R4) are synchronous, but the readout intervals between two adjacent pixel circuit rows have a delayed readout interval, wherein the delayed readout interval allows the output circuits 20 coupled to a same pixel circuit column (e.g., C1-C8 in FIG. 2) to sequentially read the stored charges of every pixel circuit 10, and a value of the delayed readout interval is determined according to circuit parameters. The method of the image sensor 1 capturing other images (e.g., a second image) is identical to that of capturing the first image, and thus details thereof are not repeated herein.

Figure 5:
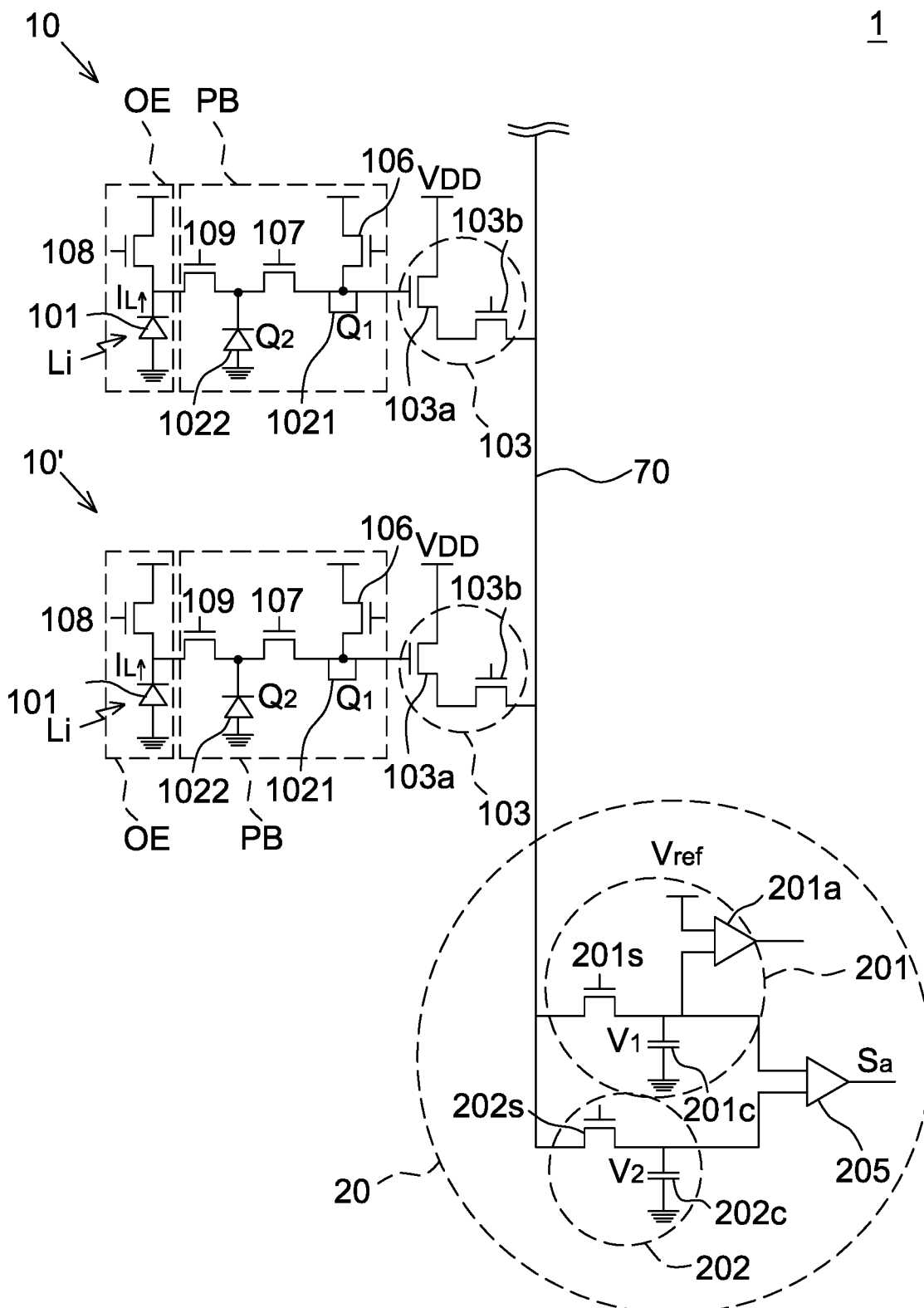
FIG. 5 is a circuit diagram of an image sensor according to a first embodiment of the present disclosure.
Figure 6:
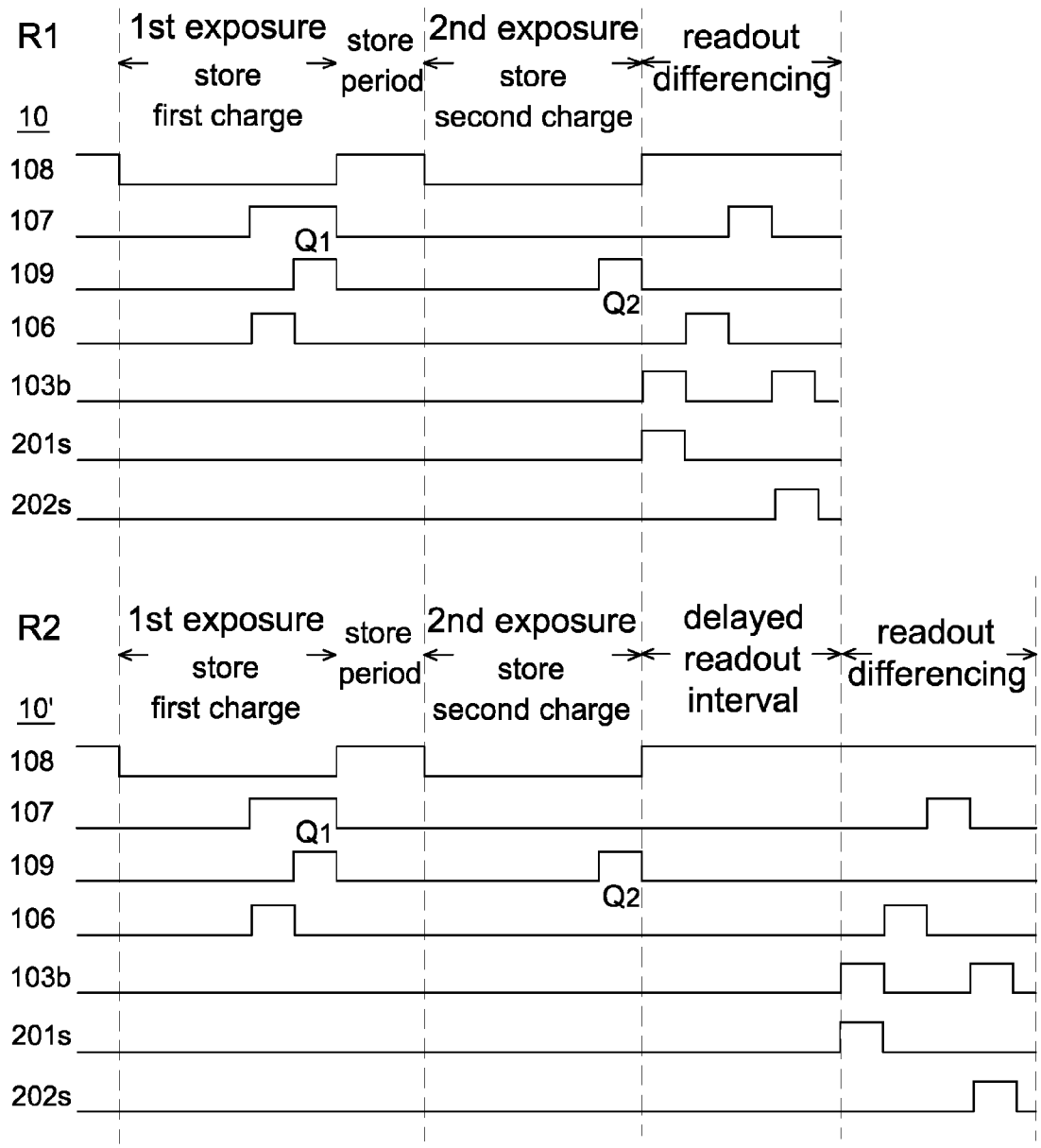
FIG. 6 is a signal timing diagram of an image sensor according to a first embodiment of the present disclosure.

Referring to FIGS. 5 and 6, FIG. 5 is a circuit diagram of an image sensor 1 according to a first embodiment of the present disclosure; and FIG. 6 is a signal timing diagram of the image sensor 1 of FIG. 5. It should be mentioned that FIGS. 5 and 6 show only two pixel circuits 10 and 10' in one pixel circuit column (e.g., pixel circuits corresponding to pixel circuit rows R1 and R2 in the one pixel circuit column). As all pixel circuits 10 of the image sensor 1 have identical circuit structures, the present disclosure is explained by using the pixel circuit 10 as an example.

As mentioned above, the pixel circuit 10 includes an optoelectronic conversion circuit OE, a pixel buffer circuit PB and a transfer circuit 103. The optoelectronic conversion circuit OE includes an optoelectronic element 101 and a switching element 108, wherein the optoelectronic element 101 is, for example, a photodiode. The pixel buffer circuit PB includes a floating diffusion region (FD) 1021, a storage node (SN) 1022 and three switching elements 106, 107 and 109. The transfer circuit 103 includes a source follower transistor 103a and a switching element 103b. In the present disclosure, the above switching elements are, for example, transistor devices or analog switches.

In the optoelectronic conversion circuit OE, after the optoelectronic element 101 receives incident light Li, a photocurrent $I_L$ is generated. The switching element 108 is used to control the release of accumulated charges in the optoelectronic element 101. Accordingly, when the switching element 108 is conducted, the optoelectronic element 101 is coupled to a voltage source $V_{DD}$ such that the photocurrent $I_L$ generated by the optoelectronic element 101 is released without being accumulated continuously. Accordingly, the switching element 108 is sometimes referred to an anti-blooming transistor herein. A time interval during which the switching element 108 is not conducted (or turned off) is referred to a valid exposure time, and the optoelectronic element 101 starts to accumulate charges in the valid exposure time.

In the pixel buffer circuit PB, the switching element 109 is coupled between the optoelectronic conversion circuit OE (e.g., a node between the switching element 108 and the optoelectronic element 101) and the storage node 1022 for controlling the photocurrent $I_L$ generated by the optoelectronic conversion circuit OE to be stored in the storage node 1022. Accordingly, the switching element 109 is sometimes referred to a storage gate transistor herein. The switching element 107 is coupled between the storage node 1022 and the floating diffusion region 1021 for controlling charges stored in the storage node 1022 to be transferred to the floating diffusion region 1021. Accordingly, the switching element 107 is sometimes referred to a transfer gate transistor herein. The switching element 106 is coupled between the floating diffusion region 1021 and the voltage source $V_{DD}$ for resetting charges stored in the floating diffusion region 1021. Accordingly, the switching element 106 is sometimes referred to a reset transistor herein.

The transfer circuit 103 is coupled between the floating diffusion region 1021 and a readout line 70. The source follower transistor 103a is used to convert charges stored in the floating diffusion region 1021 to a voltage signal. The switching element 103b is used to control the floating diffusion region 1021 to be coupled to the readout line 70 to output the voltage signal to the output circuit 20 via the readout line 70 for storage. For example, when the switching element 103b receives a row select signal, the switching element 103b is conducted to output the voltage signal generated by the source follower transistor 103a to the readout line 70. Accordingly, the switching element 103b is sometimes referred to a row select transistor herein.

As mentioned above, each of the output circuits 20 includes a first storage circuit 201, a second storage circuit 202 and a differential unit 205. The first storage circuit 201 and the second storage circuit 202 respectively include a switching element (e.g., transistor device) and a storage capacitor (e.g., capacitor device). The switching elements are used to control the first storage circuit 201 and the second storage circuit 202 to be coupled to the readout line 70. For example, the first storage circuit 201 includes a first switching element 201s and a first storage capacitor 201c, and the second storage circuit 202 includes a second switching element 202s and a second storage capacitor 202c. When the first switching element 201s is conducted, the first storage capacitor 201c stores a first output voltage $V_1$ (e.g., outputted by the source follower transistor 103a according to a first charge Q1) from the pixel circuit 10 via the readout line 70. When the second switching element 202s is conducted, the second storage capacitor 202c stores a second output voltage $V_2$ (e.g., outputted by the source follower transistor 103a according to a second charge Q2) from the pixel circuit 10 via the readout line 70. It is appreciated that the first switching element 201s and the second switching element 202s are not conducted simultaneously such that the first output voltage $V_1$ and the second output voltage $V_2$ are stored respectively.

In some embodiments, the first storage circuit 201 or the second storage circuit 202 further includes a comparator 201a for comparing the first output voltage $V_1$ or the second output voltage $V_2$ with a reference voltage Vref, wherein an output terminal of the comparator 201a is, for example, coupled to the processor 37 (shown in FIG. 2). The processor 37 then identifies whether an auto exposure is performed according an output of the comparator 201a so as to correspondingly control the exposure time according to intensity of incident light Li. For example, when the incident light Li is stronger, the exposure time is reduced (or adjusting a diaphragm, white balance and so on) to avoid the over exposure of outputted images. For example, when the reference voltage Vref is larger than the first output voltage $V_1$ or the second output voltage $V_2$, the comparator 201a outputs a digital value "0" such that the exposure time is not adjusted; whereas, when the reference voltage Vref is equal to or smaller than the first output voltage $V_1$ or the second output voltage $V_2$, the comparator 201a outputs a digital value "1" such that the exposure time is adjusted, or vice versa.

Referring to FIGS. 5 and 6, in capturing one image, the anti-blooming transistor 108 is turned off to enter a first exposure time such that the optoelectronic element 101 starts to accumulate charges. In the first exposure time, both the reset transistor 106 and the transfer gate transistor 107 are conducted at first to reset residual charges in the pixel buffer circuit PB. Next, the storage gate transistor 109 and the transfer gate transistor 107 are sequentially conducted or simultaneously conducted (e.g., simultaneously conducted being shown in FIG. 6) such that the floating diffusion region 1021 receives the photocurrent $I_L$ within the first exposure time to store a first charge Q1. As mentioned above, as the image sensor 1 is applied to a motion sensor, the first charge Q1 is stored in the floating diffusion region 1021 for a storage interval to allow a detected object has a change. In the storage interval, the anti-blooming transistor 108 is conducted such that the photocurrent $I_L$ generated by the optoelectronic element 101 is released via the anti-blooming transistor 108.

After the storage interval, the anti-blooming transistor 108 is turned off again to enter a second exposure time. In the second exposure time, the storage gate transistor 109 is conducted such that the storage node 1022 receives the photocurrent $I_L$ within the second exposure time to store a second charge Q2.

After the pixel buffer circuit PB stores the second charge Q2, the anti-blooming transistor 108 is turned off to enter a readout interval. In the readout interval, both the row select transistor 103b and the first switching element 201s are conducted at first such that the first storage capacitor 201c of the first storage circuit 201 reads, within the readout interval, a first output voltage $V_1$ formed by the first charge Q1 stored in the floating diffusion region 1021. Next, the reset transistor 106 is conducted to reset residual charges in the floating diffusion region 1021. Next, the transfer gate transistor 107 is conducted to transfer the second charge Q2 in the storage node 1022 to the floating diffusion region 1021. Next, both the row select transistor 103b and the second switching element 202s are conducted such that the second storage capacitor 202c of the second storage circuit 202 reads, within the readout interval, a second output voltage $V_2$ formed by the second charge Q2 stored in the floating diffusion region 1021. Finally, the differential unit 205 compares, within the readout interval, the first output voltage $V_1$ with the second output voltage $V_2$ to output an analog image signal Sa.

It should be mentioned that the present disclosure is explained by performing the differential operation within the readout interval to indicate that the second output voltage $V_2$ is immediately calculated by the differential operation after being stored thereby reducing the charge leakage as much as possible. In other embodiments, it is possible that the differential operation is not performed in the readout interval.

As shown in FIG. 6, the operation of pixel circuit row R2 (e.g., pixel circuit 10') is similar to that of the operation of pixel circuit row R1 (e.g., pixel circuit 10). For example, the first exposure times, the storage intervals, the second exposure times and the readout intervals of the pixel circuit row R2 and the pixel circuit row R1 are identical, but only the readout interval of the pixel circuit row R2 has a delayed readout interval from that of the pixel circuit row R1. The delayed readout interval allows the output circuit 20 sequentially reads voltage signals of every pixel circuit 10 in a same pixel circuit column. Similarly, a readout interval of the pixel circuit row R3 has a delayed readout interval from that of the pixel circuit row R2, and so on.

Figure 7:
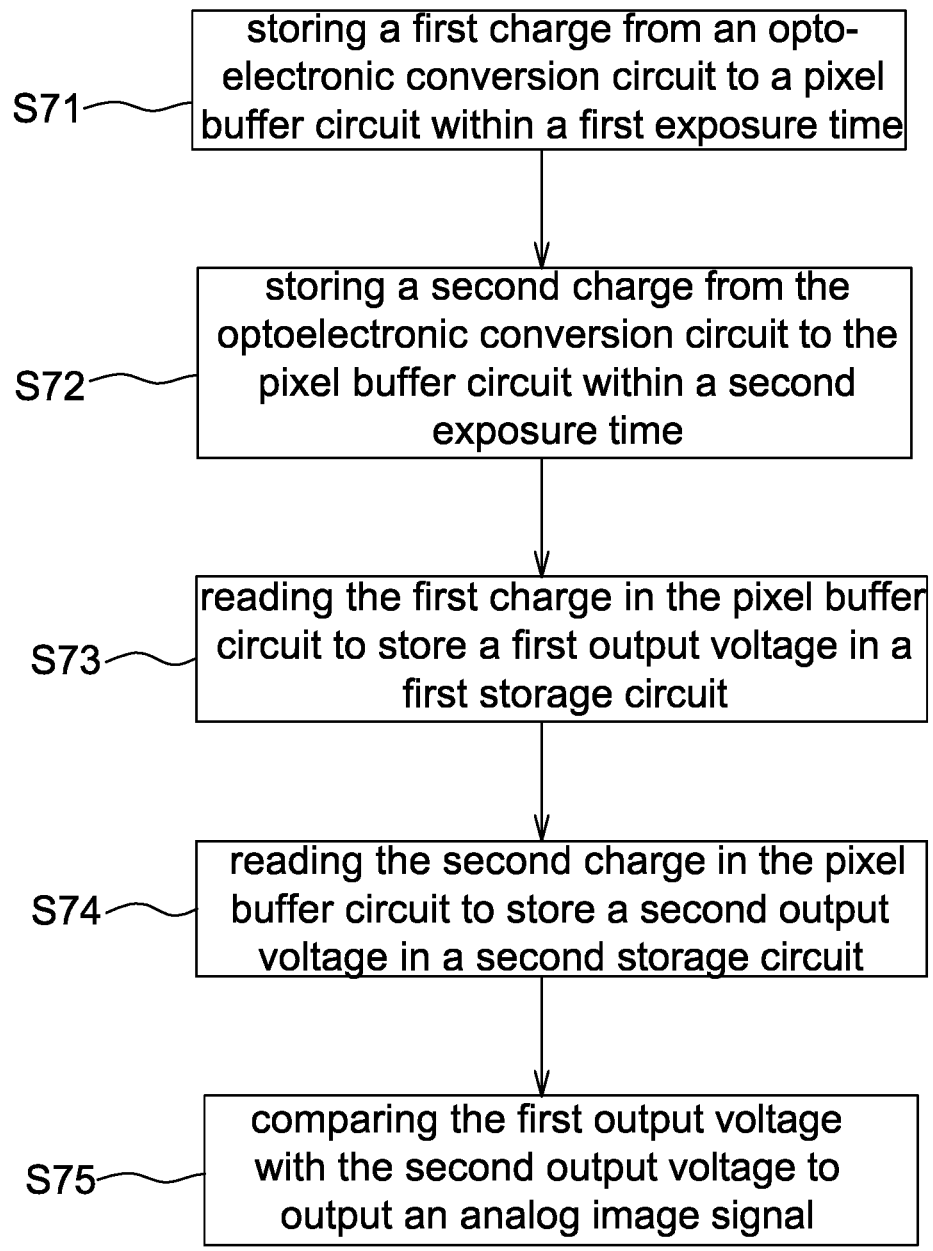
FIG. 7 is a flow chart of an operating method of an image sensor according to a first embodiment of the present disclosure.

Referring to FIG. 7, it is an operating method of an image sensor according to a first embodiment of the present disclosure including the steps of: storing a first charge from an optoelectronic conversion circuit to a pixel buffer circuit within a first exposure time (Step S71); storing a second charge from the optoelectronic conversion circuit to the pixel buffer circuit within a second exposure time (Step S72); reading the first charge in the pixel buffer circuit to store a first output voltage in a first storage circuit (Step S73); reading the second charge in the pixel buffer circuit to store a second output voltage in a second storage circuit (Step S74); and comparing the first output voltage with the second output voltage to output an analog image signal (Step S75).

Referring to FIGS. 5-7, in the Step S71, when the anti-blooming transistor 108 is turned off, a first exposure time is entered. In the first exposure time, the storage gate transistor 109 and the transfer gate transistor 107 are sequentially or simultaneously conducted to store a first charge Q1 from the optoelectronic conversion circuit OE to the pixel buffer circuit PB. The first charge Q1 is stored in the pixel buffer circuit PB for a storage interval. In the storage interval, the anti-blooming transistor 108 is conducted to release accumulated charges in the optoelectronic element 101.

In the Step S72, the anti-blooming transistor 108 is turned off again to enter a second exposure time. In the second exposure time, the storage gate transistor 109 is conducted to store a second charge Q2 from the optoelectronic conversion circuit OE to the pixel buffer circuit PB. When the anti-blooming transistor 108 is conducted again, the second exposure time is ended.

In the Steps S73-S74, in order to shorten an interval during which the first charge Q1 and the second charge Q2 are stored in the pixel buffer circuit PB, preferably a readout interval is immediately entered after the second exposure time is over. In the readout interval, both the row select transistor 103b and the first switching element 201s are conducted such that the first charge Q1 in the pixel buffer circuit PB is read by the readout circuit 20 to store a first output voltage $V_1$ in a first storage circuit 201. Next, both the row select transistor 103b and the second switching element 202s are conducted such that the second charge Q2 in the pixel buffer circuit PB is read by the readout circuit 20 to store a second output voltage $V_2$ in a second storage circuit 202. In this embodiment, the first output voltage $V_1$ and the second output voltage $V_2$ are generated by the source follower transistor 103a according to the first charge Q1 and the second charge Q2.

In the Step 75, finally the differential unit 205 of the output circuit 20 compares the first output voltage $V_1$ with the second output voltage $V_2$ to output an analog image signal Sa, e.g., performing a subtraction between the first output voltage $V_1$ and the second output voltage $V_2$.

It should be mentioned that the ON/OFF and timing of every switching element in FIG. 6 are only intended to illustrate but not to limit the present disclosure. In the first embodiment, two charge amounts are respectively stored in the pixel buffer circuit PB within two exposure times, and the two charge amounts are respectively readout within a readout interval from the pixel buffer circuit PB to the output circuit 20 to be stored as two output voltages for the differential operation.

Figure 8:
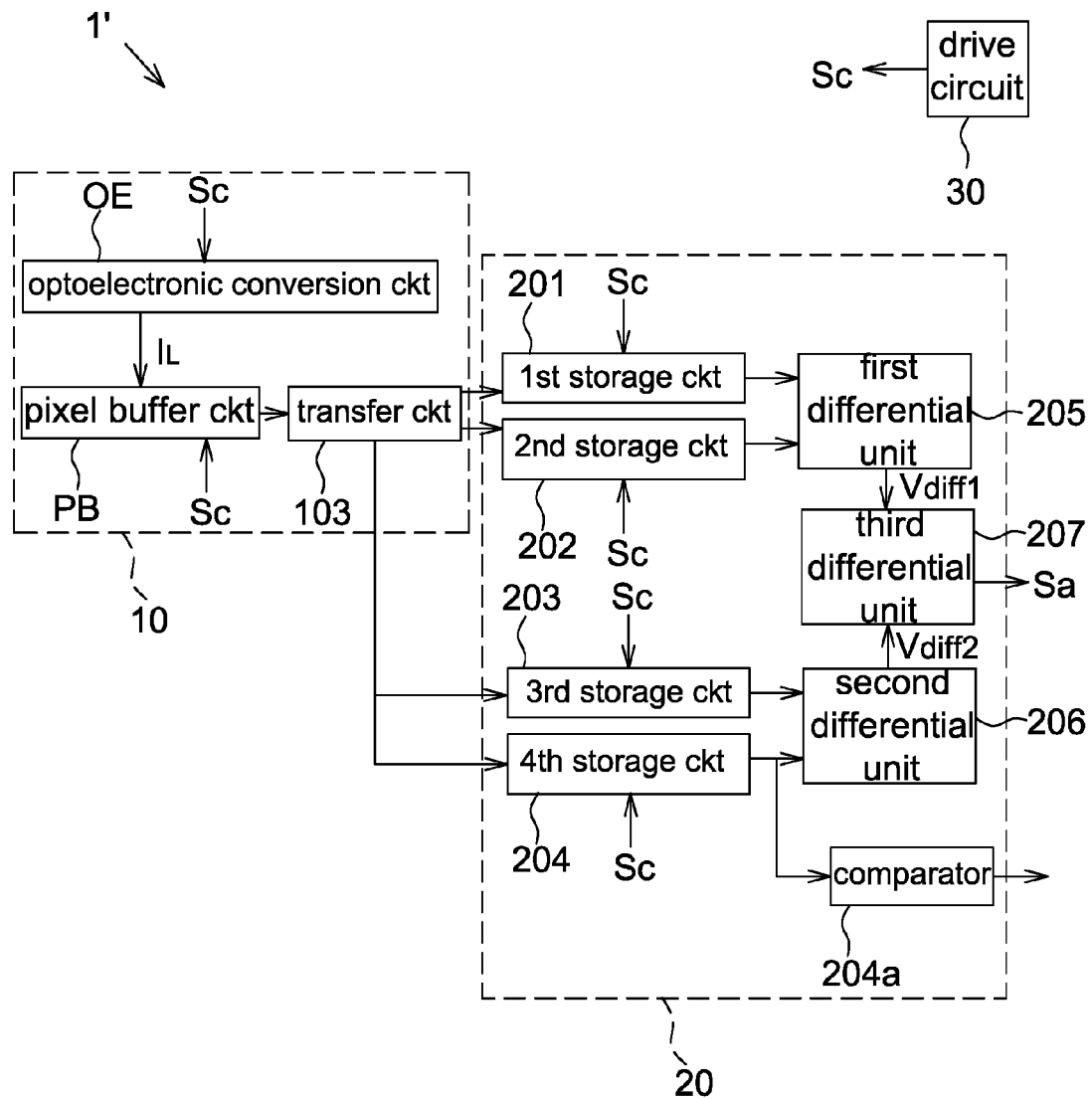
FIG. 8 is a block diagram of an image sensor according to a second embodiment of the present disclosure.

Referring to FIG. 8, it is a block diagram of an image sensor 1' according to a second embodiment of the present disclosure. The image sensor 1' is applicable to the image system 100 of FIG. 2. The image sensor 1' also includes a plurality of pixel circuits 10 arranged in a matrix and a plurality of output circuits 20. Each of the pixel circuits 10 also includes an optoelectronic conversion circuit OE, a pixel buffer circuit PB and a transfer circuit 103. Each of the output circuits 20 is coupled to every pixel circuit 10 of one pixel circuit column and includes a first storage circuit 201, a second storage circuit 202, a third storage circuit 203, a fourth storage circuit 201, a first differential unit 205, a second differential unit 206 and a third differential unit 207, wherein the first storage circuit 201 to the fourth storage circuit 204 include, for example, a capacitor, and the first differential unit 205 to the third differential unit 207 are, for example, differential amplifiers. In some embodiments, each of the output circuits 20 further includes a comparator 204a for implementing the control of auto exposure. As mentioned in the first embodiment, the pixel circuits 10 and the output circuits 20 operate according to the control signal Sc from a drive circuit 30.

The optoelectronic conversion circuit OE generates a photocurrent $I_L$ to the pixel buffer circuit PB. The pixel buffer circuit PB receives the photocurrent $I_L$ to accordingly store a charge amount. The transfer circuit 103 converts the stored charge in the pixel buffer circuit PB to a voltage signal to be outputted to the output circuit 20. The first storage circuit 201 to the fourth storage circuit 204 temporarily store output voltages before the differential operation for the first differential unit 205 to the third differential unit 207 to perform the differential operation and output an analog image signal Sa.

An output terminal of the third differential unit 207 is coupled to an analog to digital converter 35 (as shown in FIG. 2) to convert the analog image signal Sa to a digital image signal Sd. The difference between the second embodiment and the first embodiment is that, in the second embodiment the output circuit 20 further includes the third storage circuit 203, the fourth storage circuit 204, the second differential unit 206 and the third differential unit 207; whereas, the pixel circuits 20 are identical. In the second embodiment, the image sensor 1' is also used to identify the object motion and motion position, and perform the gesture recognition or the like.

Figure 9:
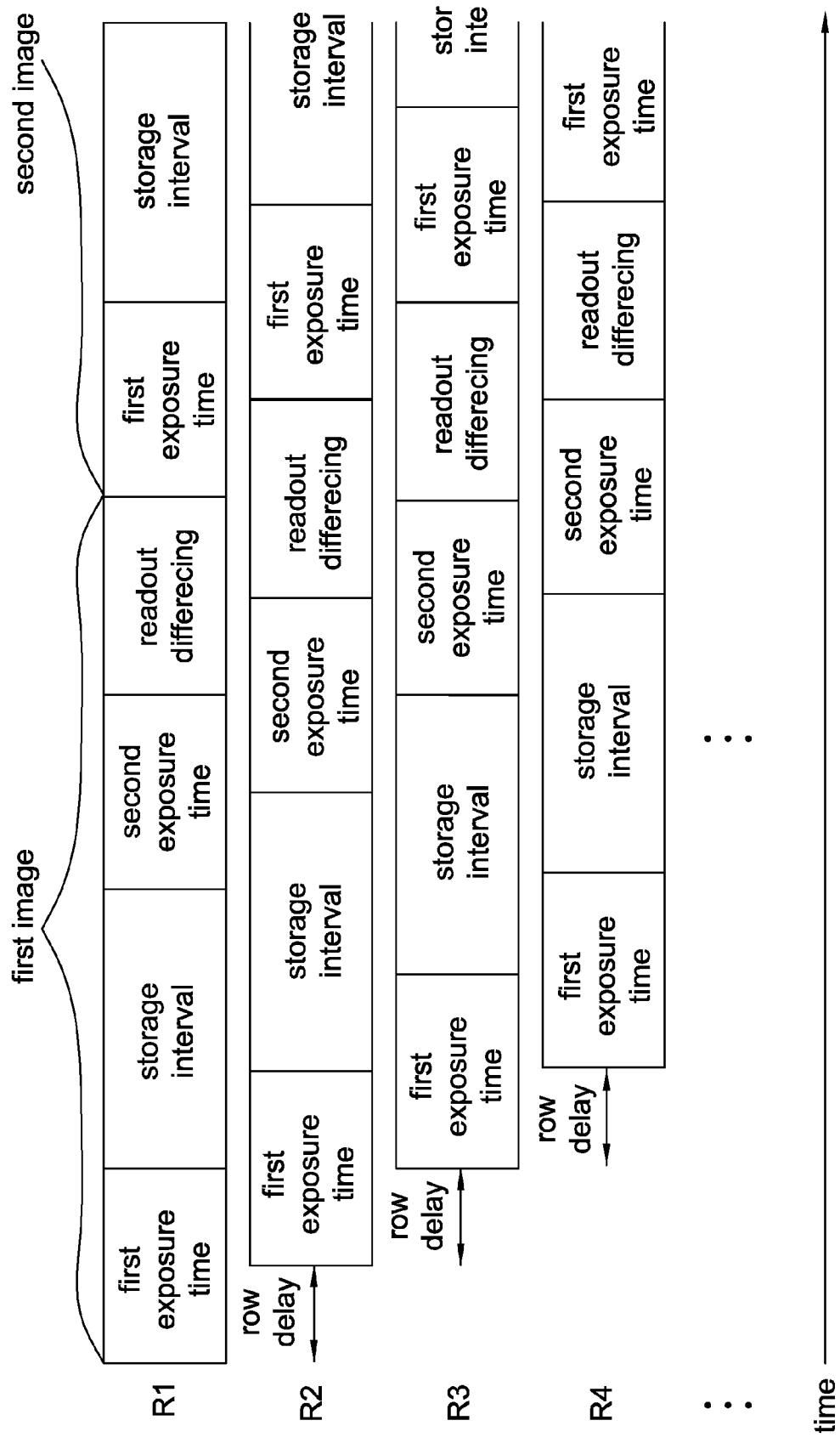
FIG. 9 is a timing diagram of an operation of an image sensor according to a second embodiment of the present disclosure.

Referring to FIG. 9, it is a timing diagram of an operation of an image sensor 1' according to a second embodiment of the present disclosure. In the second embodiment, the image sensor 1' is a rolling shutter image sensor. In an interval of capturing one image (e.g., a first image), the operation of each of the pixel circuits 10 includes a first exposure time, a storage interval, a second exposure time and a readout interval. The first exposure time and the second exposure time are used to store charges corresponding to two different time intervals. As this embodiment is operated without using a system light source, the stored charges are positively correlated with ambient light intensity. The storage interval is between the first exposure time and the second exposure time to determine a time difference between the first exposure time and the second exposure time. As the time difference is for an object to change the position or status thereof within the time difference, the storage interval is larger than 0 and identical in every pixel circuit row. A value of the storage interval is determined according to different applications and has been described above, and thus details thereof are not repeated herein. In the readout interval, a voltage signal associated with the stored charge is read from the pixel buffer circuit PB to the output circuit 20, and the differential operation of output voltages is performed. As shown in FIG. 9, operations of every pixel circuit row (e.g., R1-R4) are identical, but only an initial time of the first exposure time between two adjacent pixel circuit rows have a row delay time which is determined according to circuit parameters. The method of the image sensor 1' capturing other images (e.g., a second image) is identical to that of capturing the first image, and thus details thereof are not repeated herein.

Figure 10:
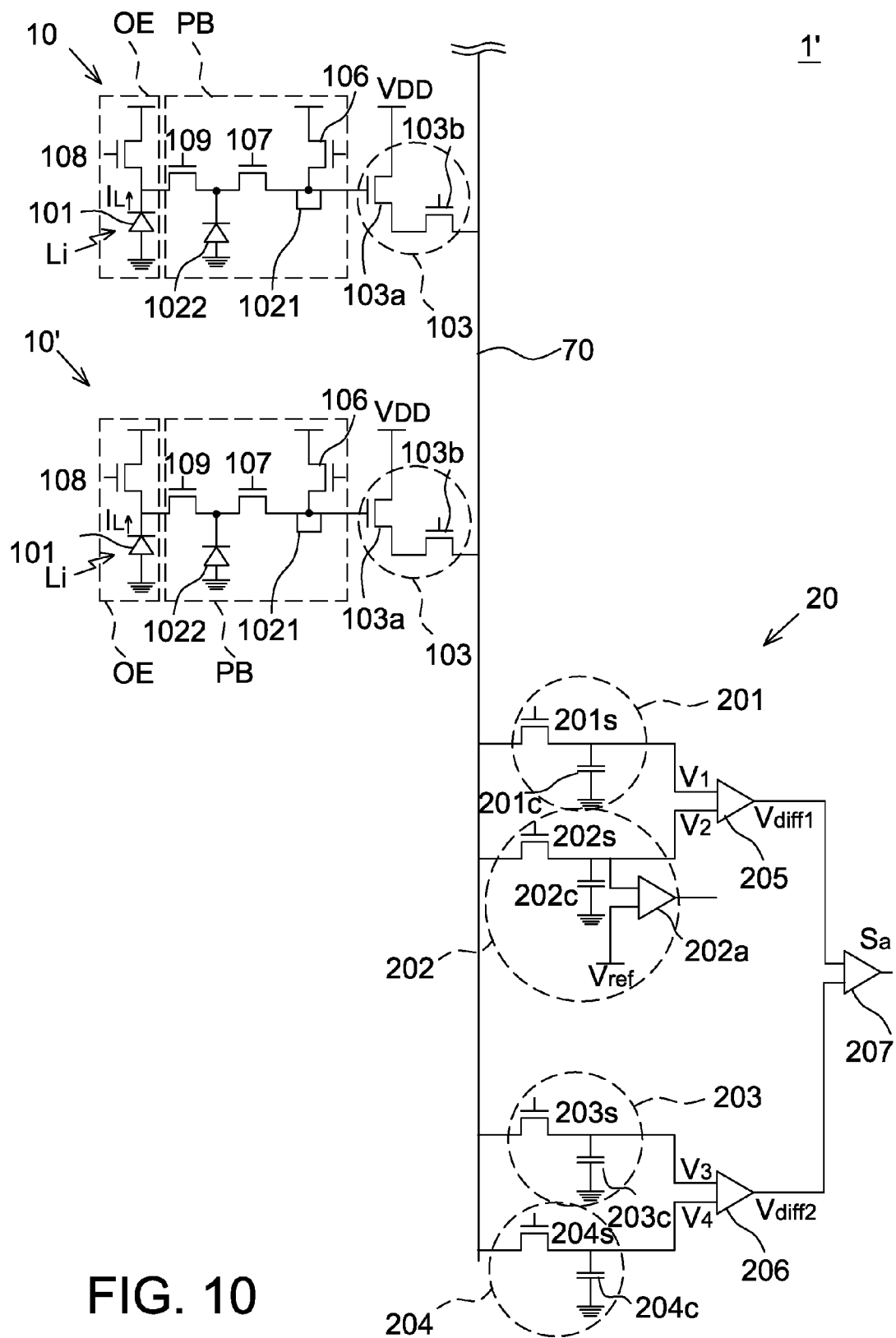
FIG. 10 is a circuit diagram of an image sensor according to a second embodiment of the present disclosure.
Figure 11:
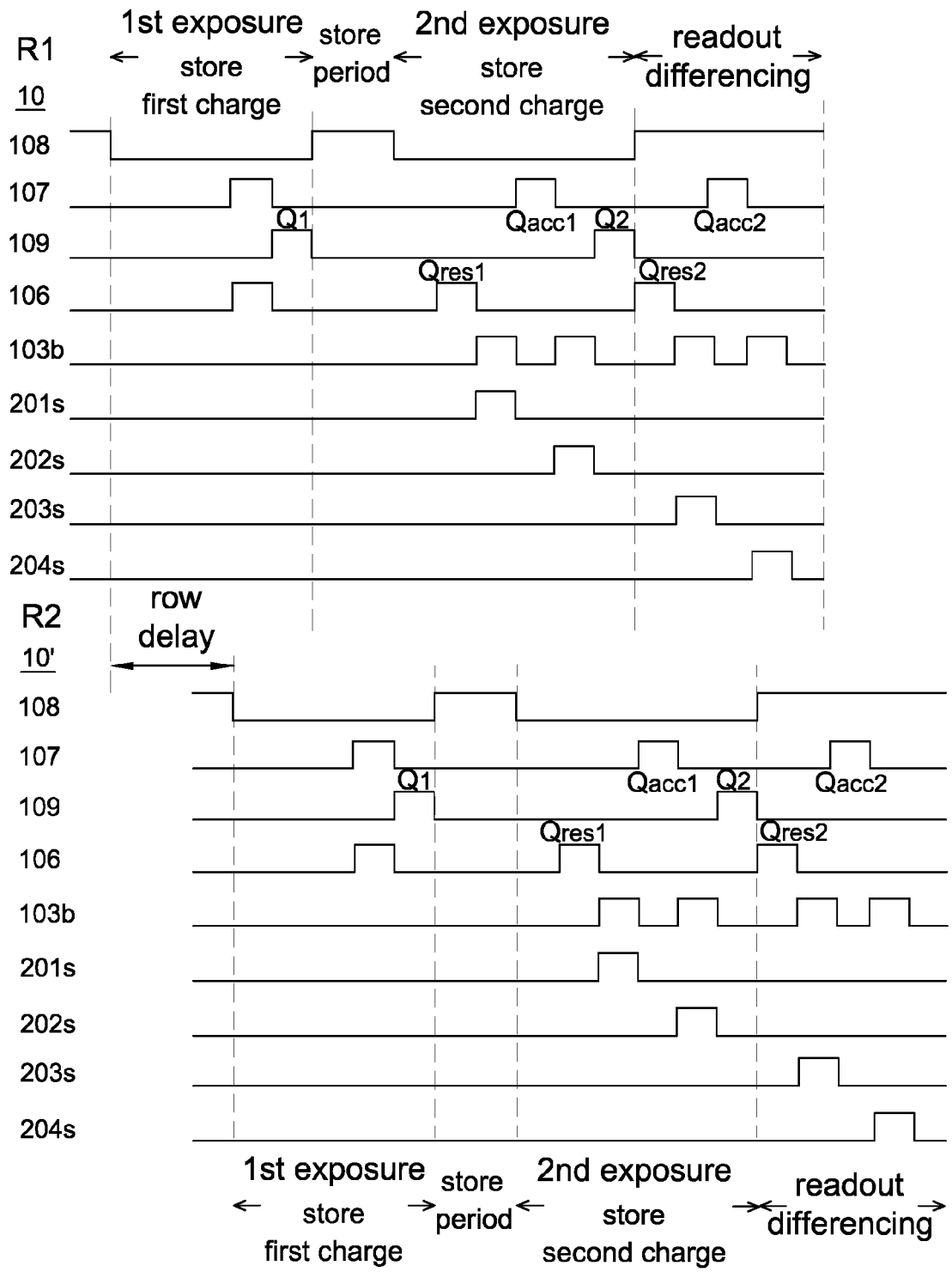
FIG. 11 is a signal timing diagram of an image sensor according to a second embodiment of the present disclosure.

Referring to FIGS. 10 and 11, FIG. 10 is a circuit diagram of an image sensor 1' according to a second embodiment of the present disclosure; and FIG. 11 is a signal timing diagram of the image sensor 1' of FIG. 10. It should be mentioned that FIGS. 10 and 11 show only two pixel circuits 10 and 10' in one pixel circuit column (e.g., pixel circuits corresponding to pixel circuit rows R1 and R2 in the one pixel circuit column). Similarly, all pixel circuits 10 of the image sensor 1' have identical circuit structures.

The optoelectronic conversion circuit OE includes an optoelectronic element 101 and a switching element 108. After the optoelectronic element 101 receives incident light Li, a photocurrent $I_L$ is generated. The switching element 108 is used to control the release of accumulated charges in the optoelectronic element 101.

The pixel buffer circuit PB includes a floating diffusion region 1021, a storage node 1022 and three switching elements 106, 107 and 109. The switching element 109 is coupled between the optoelectronic conversion circuit OE and the storage node 1022 for controlling the photocurrent $I_L$ generated by the optoelectronic conversion circuit OE to be stored in the storage node 1022. The switching element 107 is coupled between the storage node 1022 and the floating diffusion region 1021 for controlling the floating diffusion region 1021 to receive a first charge Q1 and a second charge Q2 from the storage node 1022. The switching element 106 is coupled between the floating diffusion region 1021 and a voltage source $V_{DD}$ for resetting stored charges in the pixel buffer circuit PB.

The transfer circuit 103 is coupled between the floating diffusion region 1021 and a readout line 70 for controlling the floating diffusion region 1021 to be coupled to the readout line 70. A source follower transistor 103a is used to convert the stored charges in the floating diffusion region 1021 to a voltage signal. A switching element 103b is used to control the floating diffusion region 1021 to be coupled to the readout line 70 to output the voltage signal to the output circuit 20 via the readout line 70.

The pixel circuits 10 of the second embodiment are identical to the pixel circuits 10 of the first embodiment, and since descriptions of the pixel circuits 10 have been illustrated above, details thereof are not repeated herein.

Each of the output circuits 20 includes a first storage circuit 201, a second storage circuit 202, a third storage unit 203, a fourth storage circuit 204, a first differential unit 205, a second differential unit 206 and a third differential unit 207. The first storage circuit 201 to the fourth storage circuit 204 respectively include a switching element (e.g., transistor device) and a storage capacitor (e.g., capacitor device). The switching elements are used to control the first storage circuit 201 to the fourth storage circuit 204 to be coupled to the readout line 70. For example, the first storage circuit 201 includes a first switching element 201s and a first storage capacitor 201c, the second storage circuit 202 includes a second switching element 202s and a second storage capacitor 202c, the third storage circuit 203 includes a third switching element 203s and a third storage capacitor 203c, and the fourth storage circuit 204 includes a fourth switching element 204s and a fourth storage capacitor 204c. When the first switching element 201s is conducted, the first storage capacitor 201c stores a first reset voltage $V_1$ from the pixel circuit 10 via the readout line 70. When the second switching element 202s is conducted, the second storage capacitor 202c stores a first output voltage $V_2$ from the pixel circuit 10 via the readout line 70. When the third switching element 203s is conducted, the third storage capacitor 203c stores a second reset voltage $V_3$ from the pixel circuit 10 via the readout line 70. When the fourth switching element 204s is conducted, the fourth storage capacitor 204c stores a second output voltage $V_4$ from the pixel circuit 10 via the readout line 70. It is appreciated that the first switching element 201s to the fourth switching element 204s are not conducted simultaneously such that the first reset voltage $V_1$, the first output voltage $V_2$, the second reset voltage $V_3$ and the second output voltage $V_4$ are stored respectively. In addition, a sequence of conducting the first switching element 201s to the fourth switching element 204s is not limited to that illustrated herein as long as the first reset voltage $V_1$, the first output voltage $V_2$, the second reset voltage $V_3$ and the second output voltage $V_4$ are sequentially stored.

In some embodiments, the second storage circuit 202 or the fourth storage circuit 204 further includes a comparator 202a (e.g., included in the second storage circuit 202 shown in FIG. 10) for comparing the first output voltage $V_2$ or the second output voltage $V_4$ with a reference voltage Vref for realizing the control of auto exposure. The purpose of adopting the comparator 202a is identical to that of the first embodiment, and thus details thereof are not repeated herein.

Referring to FIGS. 10 and 11, in capturing one image, the anti-blooming transistor 108 is turned off at first to enter a first exposure time such that the optoelectronic element 101 starts to accumulate charges. In the first exposure time, both the reset transistor 106 and the transfer gate transistor 107 are conducted to reset residual charges in the pixel buffer circuit PB. Next, the storage gate transistor 109 is conducted such that the storage node 1022 receives the photocurrent $I_L$ within the first exposure time to store a first charge Q1 for a storage interval. As mentioned above, the storage interval is for separating the first exposure time and the followed second exposure time to allow an object has a change. Similarly, in the storage interval, the anti-blooming transistor 108 is conducted such that the photocurrent $I_L$ generated by the optoelectronic element 101 is released via the anti-blooming transistor 108.

Next, after the storage interval, the anti-blooming transistor 108 is turned off again to enter a second exposure time. In the second exposure time, the reset transistor 106 is conducted such that the floating diffusion region 1021 stores a first reset charge Qres1 within the second exposure time, wherein the first reset charge Qres1 is the residual charge after the floating diffusion region 1021 is reset. If the residual charge is not removed, the signal to noise ratio (SNR) of the image signal can be degraded. Next, both the row select transistor 103b and the first switching element 201s are conducted such that the first storage capacitor 201c of the first storage circuit 201 reads, within the second exposure time, a first reset voltage $V_1$ (outputted by the source follower transistor 103a according to the first reset charge Qres1) formed by the first reset charge Qres1 in the floating diffusion region 1021. Next, the transfer gate transistor 107 is conducted to transfer the first charge Q1 in the storage node 1022 to the floating diffusion region 1021 for accumulation and store a first accumulation charge Qacc1 of accumulating the first charge Q1 and the first reset charge Qres1. Next, both the row select transistor 103b and the second switching element 202s are conducted such that the second storage capacitor 202c of the second storage circuit 202 reads, within the second exposure time, a first output voltage $V_2$ (outputted by the source follower transistor 103a according to the first accumulation charge Qacc1) formed by the first accumulation charge Qacc1 in the floating diffusion region 1021. Next, the storage gate transistor 109 is conducted such that the storage node 1022 receives the photocurrent $I_L$ within the second exposure time to store a second charge Q2.

After the pixel buffer circuit PB stores the second charge Q2, the anti-blooming transistor 108 is turned off to enter a readout interval. In the readout interval, the reset transistor 106 is conducted such that the floating diffusion region 1021 stores a second reset charge Qres2 within the readout interval, wherein the second reset charge Qres2 is the residual charge after the floating diffusion region 1021 is reset. Next, both the row select transistor 103b and the third switching element 203s are conducted such that the third storage capacitor 203c of the third storage circuit 203 reads a second reset voltage $V_3$ (outputted by the source follower transistor 103a according to the second reset charge Qres2) formed by the second reset charge Qres2 in the floating diffusion region 1021 within the readout interval. Next, the transfer gate transistor 107 is conducted to transfer the second charge Q2 in the storage node 1022 to the floating diffusion region 1021 for accumulation and store a second accumulation charge Qacc2 of accumulating the second charge Q2 and the second reset charge Qres2 in the floating diffusion region 1021. Next, both the row select transistor 103b and the fourth switching element 204s are conducted such that the fourth storage capacitor 204c of the fourth storage circuit 204 reads a second output voltage $V_4$ (outputted by the source follower transistor 103a according to the second accumulation charge Qacc2) formed by the second accumulation charge Qacc2 in the floating diffusion region 1021 within the readout interval. Finally, the first differential unit 205 compares the first reset voltage $V_1$ with the first output voltage $V_2$, e.g., performing a subtraction, to output a first differential signal $V_{diff1}$, wherein the first differential unit 205 is used to cancel the residual charges in the first output voltage $V_2$ not being removed within the reset interval thereby improving the SNR. The second differential unit 206 compares the second reset voltage $V_3$ with the second output voltage $V_4$, e.g., performing a subtraction, to output a second differential signal $V_{diff2}$, wherein the second differential unit 206 is used to cancel the residual charges in the second output voltage $V_4$ not being removed within the reset interval thereby improving the SNR. The third differential unit 207 compares the first differential signal $V_{diff1}$ with the second differential signal $V_{diff2}$ to output an analog image signal Sa.

Compared with the first embodiment, the analog image signal Sa obtained in the second embodiment has a much better SNR to significantly improve the operating accuracy of the digital back end.

Referring to FIG. 11, the operation of the pixel circuit row R2 (e.g., pixel circuit 10') is identical to that of the pixel circuit row R1 (e.g., pixel circuit 10). For example, the first exposure times, the storage intervals, the second exposure times and the readout intervals of the pixel circuit row R1 and the pixel circuit row R2 are identical, but only an initial time of the first exposure time of the pixel circuit row R2 has a row delay time from that of the pixel circuit row R1. Similarly, an initial time of the first exposure time of the pixel circuit row R3 has a row delay time from that of the pixel circuit row R2, and so on.

Figure 12:
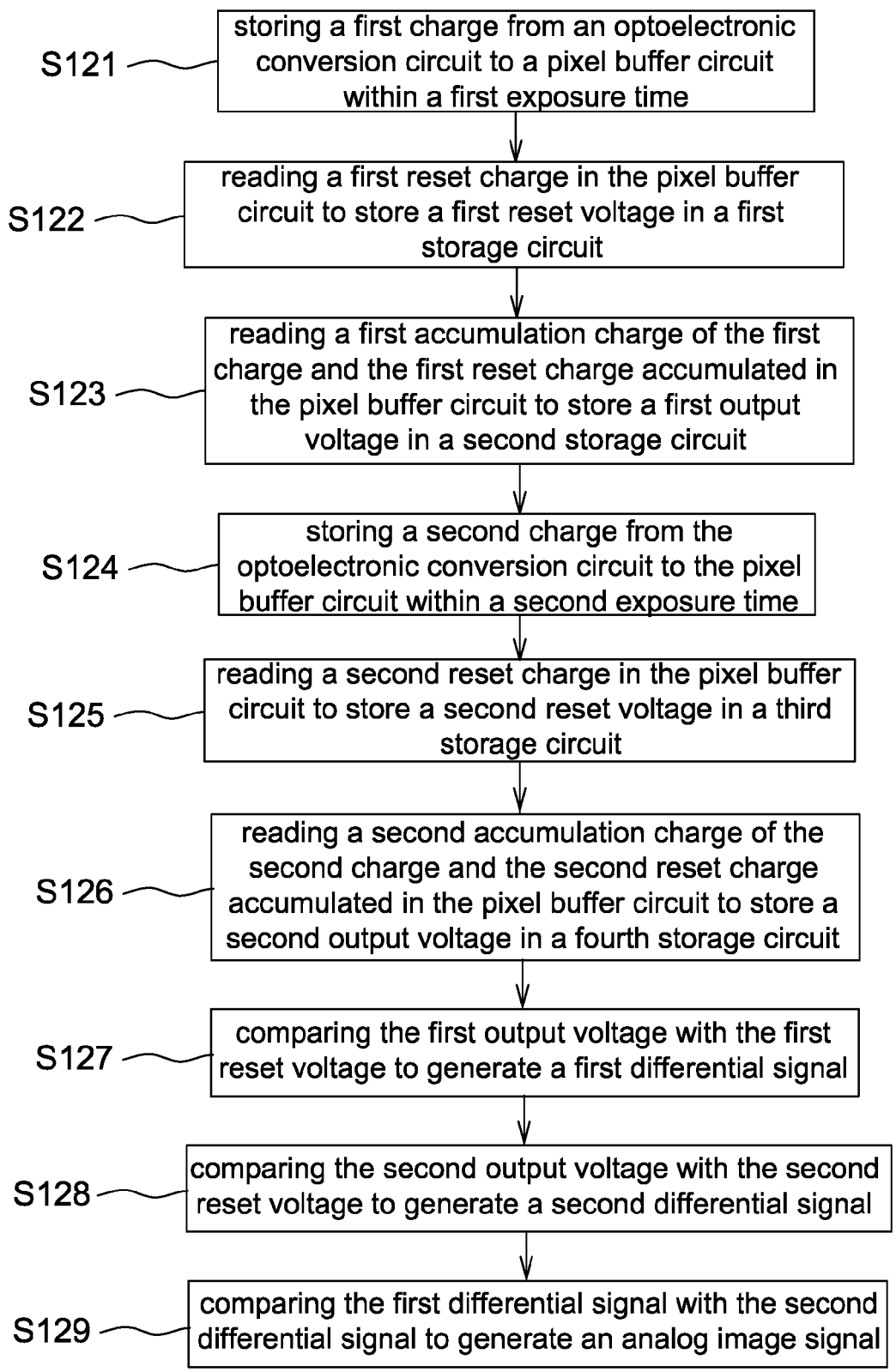
FIG. 12 is a flow chart of an operating method of an image sensor according to a second embodiment of the present disclosure.

Referring to FIG. 12, it is an operating method of an image sensor according to a second embodiment of the present disclosure including the steps of: storing a first charge from an optoelectronic conversion circuit to a pixel buffer circuit within a first exposure time (Step S121); reading a first reset charge in the pixel buffer circuit to store a first reset voltage in a first storage circuit (Step S122); reading a first accumulation charge of the first charge and the first reset charge accumulated in the pixel buffer circuit to store a first output voltage in a second storage circuit (Step S123); storing a second charge from the optoelectronic conversion circuit to the pixel buffer circuit within a second exposure time (Step S124); reading a second reset charge in the pixel buffer circuit to store a second reset voltage in a third storage circuit (Step S125); reading a second accumulation charge of the second charge and the second reset charge accumulated in the pixel buffer circuit to store a second output voltage in a fourth storage circuit (Step S126); comparing the first output voltage with the first reset voltage to generate a first differential signal (Step S127); comparing the second output voltage with the second reset voltage to generate a second differential signal (Step S128); and comparing the first differential signal with the second differential signal to generate an analog image signal (Step S129).

Referring to FIGS. 8-12, in the Step S121, when the anti-blooming transistor 108 is turned off, a first exposure time is entered. In the first exposure time, the storage gate transistor 109 is conducted to store a first charge Q1 from the optoelectronic conversion circuit OE to the pixel buffer circuit PB. The first charge Q1 is stored in the pixel buffer circuit PB for a storage interval. In the storage interval, the anti-blooming transistor 108 is conducted to release accumulated charges in the optoelectronic element 101.

In the Step S122, the anti-blooming transistor 108 is turned off again to enter a second exposure time. In the second exposure time, the reset transistor 106 is conducted to reset the pixel buffer circuit PB. In order to remove residual charges in the pixel buffer circuit PB left in the reset phase, after the pixel buffer circuit PB is reset, both the row select transistor 103b and the first switching element 201s are conducted, and the output circuit 20 reads a first reset charge Qres1 in the pixel buffer circuit PB at first to store a first reset voltage $V_1$ in a first storage circuit 201, wherein if the first reset voltage $V_1$ is not 0, it means that there exists a noise signal.

In the Step S123, the transfer gate transistor 107 is conducted such that the first charge Q1 in the pixel buffer circuit PB is accumulated to the first reset charge Qres1 to generate a first accumulation charge Qacc1. Next, both the row select transistor 103b and the second switching element 202s are conducted, and the output circuit 20 reads the first accumulation charge Qacc1 of the first charge Q1 and the first reset charge Qres1 accumulated in the pixel buffer circuit PB to store a first output voltage $V_2$ in a second storage circuit 202.

In the Step S124, the storage gate transistor 109 is conducted to store a second charge Q2 from the optoelectronic conversion circuit OE to the pixel buffer circuit PB. When the anti-blooming transistor 108 is conducted again, the second exposure time is over.

In the Step S125, when the second exposure time is ended, preferably a readout interval is entered immediately. In the readout interval, the reset transistor 106 is conducted to reset the pixel buffer circuit PB. Similarly, in order to remove residual charges in the pixel buffer circuit PB left in the reset phase, after the pixel buffer circuit PB is reset, both the row select transistor 103b and the third switching element 203s are conducted, and the output circuit 20 reads a second reset charge Qres2 in the pixel buffer circuit PB at first to store a second reset voltage $V_3$ in a third storage circuit 203, wherein if the second reset voltage $V_3$ is not 0, it means that there exists a noise signal.

In the Step S126, the transfer gate transistor 107 is conducted so that the second charge Q2 in the pixel buffer circuit PB is accumulated to the second reset charge Qres2 to generate a second accumulation charge Qacc2. Next, both the row select transistor 103b and fourth switching element 204s are conducted, and the output circuit 20 reads the second accumulation charge Qacc2 of the second charge Q2 and the second reset charge Qres2 accumulated in the pixel buffer circuit PB to store a second output voltage $V_4$ in a fourth storage circuit 204.

In the Step S127, the first differential unit 205 compares the first reset voltage $V_1$ with the first output voltage $V_2$ to generate a first differential signal $V_{diff1}$ to remove the noise in the first output voltage $V_2$.

In the Step S128, the second differential unit 206 compares the second reset voltage $V_3$ with the second output voltage $V_4$ to generate a second differential signal $V_{diff2}$ to remove the noise in the second output voltage $V_4$.

Finally, in the Step S129, the third differential unit 207 compares the first differential signal $V_{diff1}$ with the second differential signal $V_{diff2}$ to generate an analog image signal Sa.

It should be mentioned that the ON/OFF and the timing of every switching element in FIG. 11 are only intended to illustrate but not to limit the present disclosure. In the second embodiment, two accumulation charges and two reset charges are respectively stored in the pixel buffer circuit PB within two exposure times, and the two accumulation charges and the two reset charges in the pixel buffer circuit PB are respectively outputted as two output voltages and two reset voltages to the output circuit 20 for the differential operation thereby cancelling noises and improving signal to noise ratio.

As mentioned above, the turning on and turning off of every switching element in FIGS. 6 and 11 are implemented by receiving the control signal Sc from the drive circuit 30. In the embodiments of the present disclosure, an output circuit 20 coupled to one pixel circuit column is used to perform the analog differencing and output an analog image signal Sa. The differential operation is not performed in each pixel circuit so as to reduce the circuit complexity. After the analog image signal Sa is converted to a digital image signal Sd, a processor 37 is able to identify the object motion or the motion position directly according to one digital image without calculating a differential image between two digital images. According, a digital buffer for storing a whole digital image is no longer required.

It should be mentioned that the values in the above embodiments, e.g., a number of the pixel circuits 10 and output circuits 20 as well as the scale relation between every time interval are only intended to illustrate but not to limit the preset disclosure.

In some embodiments, it is possible that the image sensor 1 of the first embodiment operates in conjunction with the ON/OFF of a system light source to remove ambient light. The system light source is turned on for a predetermined time interval within the first exposure time and turned off in the second exposure time, wherein the system light source is controlled by a light source signal also outputted by the drive circuit 30. In addition, in this embodiment the image sensor 1 is not used to detect the object motion, and thus a time interval during which the first charge Q1 stored in the pixel buffer circuit PB is as short as possible, e.g., preferably 0. The timing of other signals sent from the drive signal 30 is not changed, and thus details thereof are not repeated herein.

As mentioned above, as the conventional image sensor uses two digital image frames to perform a differential operation, the power consumption is high. Therefore, the present disclosure provides an image sensor (e.g. FIGS. 3 and 8) and an operating method thereof (e.g. FIGS. 7 and 12) that may directly compare, by timing control, corresponded voltage values of a first charge and a second charge to implement the motion detection.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An image sensor comprising:
    a plurality of pixel circuits arranged in a matrix, each of the pixel circuits comprising:
        an optoelectronic conversion circuit configured to generate a photocurrent;
        a floating diffusion region configured to receive the photocurrent within a first exposure time to store a first charge and store the first charge for a storage interval; and
        a storage node configured to receive the photocurrent within a second exposure time to store a second charge, wherein the storage interval is between the first exposure time and the second exposure time; and
    a plurality of output circuits, each of the output circuits coupled to one pixel circuit column via a readout line and comprising:
        a first storage circuit configured to store a first output voltage formed by reading the first charge in the floating diffusion region within a readout interval;
        a second storage circuit configured to store a second output voltage formed by reading the second charge in the storage node within the readout interval; and
        a differential unit configured to compare the first output voltage with the second output voltage to output an analog image signal.

2. The image sensor as claimed in claim 1, wherein the storage interval is larger than 0.

3. The image sensor as claimed in claim 1, wherein the image sensor is a global shutter image sensor.

4. The image sensor as claimed in claim 1, wherein first storage circuit and the second storage circuit respectively comprise:

a switching element and a storage capacitor, and the switching element is configured to control the first storage circuit and the second storage circuit to be coupled to the readout line.

5. The image sensor as claimed in claim 4, wherein the first storage circuit or the second storage circuit further comprises:
a comparator configured to compare the first output voltage or the second output voltage with a reference voltage.

6. The image sensor as claimed in claim 1, wherein an output terminal of the output circuits is coupled to an analog to digital converter for converting the analog image signal to a digital image signal.

7. The image sensor as claimed in claim 1, wherein each of the pixel circuits further comprises:
a transfer circuit coupled between the floating diffusion region and the readout line, and configured to control the floating diffusion region to be coupled to the readout line.

8. The image sensor as claimed in claim 1, wherein each of the pixel circuits further comprises:
three switching elements respectively coupled between the optoelectronic conversion circuit and the storage node, between the storage node and the floating diffusion region, and between the floating diffusion region and a voltage source.

9. The image sensor as claimed in claim 1, wherein
the first exposure time, the storage interval and the second exposure time of each pixel circuit row are synchronous, and
the readout intervals between two adjacent pixel circuit rows have a delayed readout interval therebetween.

10. An operating method of an image sensor as claimed in claim 1, the operating method comprising:
storing a first charge from the optoelectronic conversion circuit to the floating diffusion region within a first exposure time for a storage interval;
storing a second charge from the optoelectronic conversion circuit to the storage node within a second exposure time, wherein the storage interval is between the first exposure time and the second exposure time;
reading the first charge in the floating diffusion region within a readout interval to store a first output voltage in the first storage circuit;
reading the second charge in the storage node within the readout interval to store a second output voltage in the second storage circuit; and
comparing, by the differential unit, the first output voltage with the second output voltage to output an analog image signal.

11. An image sensor comprising:
a plurality of pixel circuits arranged in a matrix, each of the pixel circuits comprising:
an optoelectronic conversion circuit configured to generate a photocurrent;
a floating diffusion region configured to sequentially store a first reset charge and a first accumulation charge of accumulating a first charge and the first reset charge within a second exposure time, and sequentially store a second reset charge and a second accumulation charge of accumulating a second charge and the second reset charge within a readout interval;
a storage node configured to receive the photocurrent within a first exposure time to store the first charge for a storage interval, sequentially transfer the first charge to the floating diffusion region to generate the first accumulation charge and receive the photocurrent to store the second charge within the second exposure time, and transfer the second charge to the floating diffusion region to generate the second accumulation charge within the readout interval, wherein the storage interval is between the first exposure time and the second exposure time; and
a plurality of output circuits, each of the output circuits coupled to one pixel circuit column via a readout line and comprising:
a first storage circuit configured to store a first reset voltage formed by reading the first reset charge in the floating diffusion region within the second exposure time;
a second storage circuit configured to store a first output voltage formed by reading the first accumulation charge in the floating diffusion region within the second exposure time;
a third storage circuit configured to store a second reset voltage formed by reading the second reset charge in the floating diffusion region within the readout interval;
a fourth storage circuit configured to store a second output voltage formed by reading the second accumulation charge in the floating diffusion region within the readout interval;
a first differential unit configured to compare the first reset voltage with the first output voltage to output a first differential signal;
a second differential unit configured to compare the second reset voltage with the second output voltage to output a second differential signal; and
a third differential unit configured to compare the first differential signal with the second differential signal to output an analog image signal.

12. The image sensor as claimed in claim 11, wherein the storage intervals of every pixel circuit row are larger than 0 and identical to each other.

13. The image sensor as claimed in claim 11, wherein the image sensor is a rolling shutter image sensor.

14. The image sensor as claimed in claim 11, wherein first storage circuit to the fourth storage circuit respectively comprise:
a switching element and a storage capacitor, and the switching element is configured to control the first storage circuit to the fourth storage circuit to be coupled to the readout line.

15. The image sensor as claimed in claim 14, wherein the second storage circuit or the fourth storage circuit further comprises:
a comparator configured to compare the first output voltage or the second output voltage with a reference voltage.

16. The image sensor as claimed in claim 11, wherein an output terminal of the third differential unit is coupled to an analog to digital converter for converting the analog image signal to a digital image signal.

17. The image sensor as claimed in claim 11, wherein each of the pixel circuits further comprises:
a transfer circuit coupled between the floating diffusion region and the readout line, and configured to control the floating diffusion region to be coupled to the readout line.

18. The image sensor as claimed in claim 11, wherein each of the pixel circuits further comprises:

a switching element coupled between the storage node and the floating diffusion region, and configured to control the floating diffusion region to receive the first charge and the second charge.

19. The image sensor as claimed in claim 11, wherein each of the pixel circuits further comprises:
a switching element coupled between the storage node and a voltage source, and configured to control resetting of the storage node.

20. An operating method of an image sensor, the image sensor comprising a plurality of pixel circuits arranged in a matrix and a plurality of output circuits, each of the pixel circuits comprising an optoelectronic conversion circuit and a pixel buffer circuit, each of the output circuits coupled to one pixel circuit column and comprising a first storage circuit, a second storage circuit, a third storage circuit and a fourth storage circuit, the operating method comprising:
storing a first charge from the optoelectronic conversion circuit to the pixel buffer circuit within a first exposure time;
reading a first reset charge in the pixel buffer circuit to store a first reset voltage in the first storage circuit;
reading a first accumulation charge of the first charge and the first reset charge accumulated in the pixel buffer circuit to store a first output voltage in the second storage circuit;
storing a second charge from the optoelectronic conversion circuit to the pixel buffer circuit within a second exposure time;
reading a second reset charge in the pixel buffer circuit to store a second reset voltage in the third storage circuit;
reading a second accumulation charge of the second charge and the second reset charge accumulated in the pixel buffer circuit to store a second output voltage in the fourth storage circuit;
comparing the first output voltage with the first reset voltage to generate a first differential signal;
comparing the second output voltage with the second reset voltage to generate a second differential signal; and
comparing the first differential signal with the second differential signal to generate an analog image signal.

* * * * *